United States Patent [19]

Catallo

[11] 4,449,921

[45] May 22, 1984

[54] COMBINED OVEN AND FUME INCINERATOR AND METHOD OF OPERATING SAME

[76] Inventor: Frank Catallo, 84 Wheatley Rd., Old Westbury, N.Y. 11568

[21] Appl. No.: 414,397

[22] Filed: Sep. 2, 1982

[51] Int. Cl.³ .............................................. F27B 9/28
[52] U.S. Cl. ......................................... 432/8; 432/59; 432/72
[58] Field of Search ............................... 432/8, 59, 72

[56] References Cited

U.S. PATENT DOCUMENTS

| | | | |
|---|---|---|---|
| 1,435,152 | 9/1922 | Currier | 34/46 |
| 1,603,760 | 10/1926 | Furkert | 34/35 |
| 1,752,483 | 4/1930 | Harrison | 432/21 |
| 1,914,574 | 6/1933 | Maehler | 34/224 |
| 1,961,143 | 6/1934 | Gehnrich | 432/176 |
| 2,696,055 | 12/1954 | Murphey | 34/157 |
| 2,745,190 | 5/1956 | Moule | 34/12 |
| 4,103,434 | 8/1978 | Walker | 432/8 |
| 4,115,052 | 9/1978 | Flynn | 432/72 |
| 4,217,090 | 8/1980 | Whike et al. | 432/59 |

OTHER PUBLICATIONS

"Fume Incineration for Process Heat Recovery", E. R. Luedtke, Jr. Copyrighted 1979 by Tappi Paper Synthetics Proceedings, pp. 305 through 316.

Primary Examiner—John J. Camby
Attorney, Agent, or Firm—Pennie & Edmonds

[57] ABSTRACT

A combined oven and fume incinerator having an enclosed housing. A combustion chamber serving as a heat source and fume incinerator is connected by a heat recovery air duct to a process zone which in turn opens into a cool air inlet passage leading to the combustion chamber and blower means are provided to circulate air through the housing, combustion chamber, heat recovery duct, process zone, cool air inlet passage and back to the combustion chamber. The heat recovery duct is in direct thermal contact with the cool air inlet passage. An exhaust fan is located in the cool air inlet passage at a point where there is the least pollution to exhaust a portion of the air in the passage to atmosphere.

10 Claims, 6 Drawing Figures

FIG. 5
FIG. 6
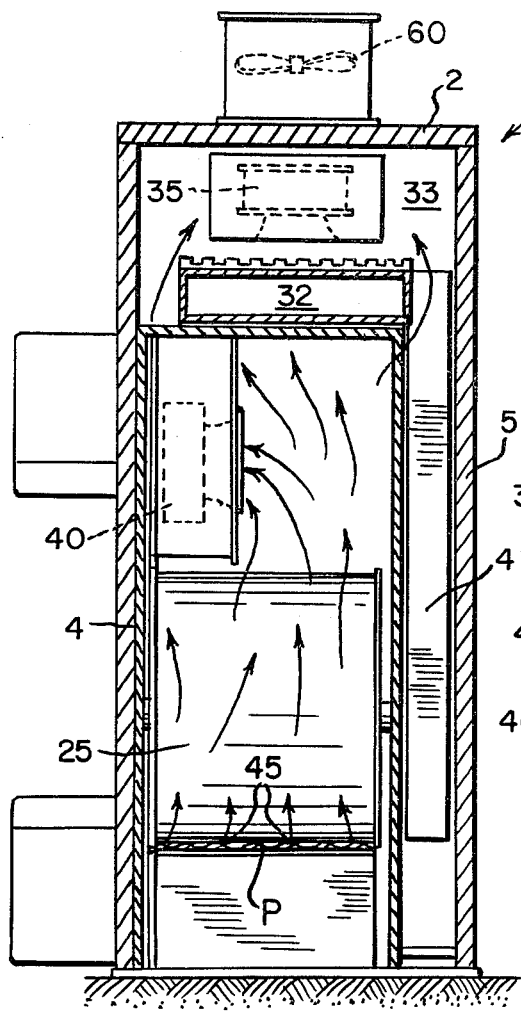
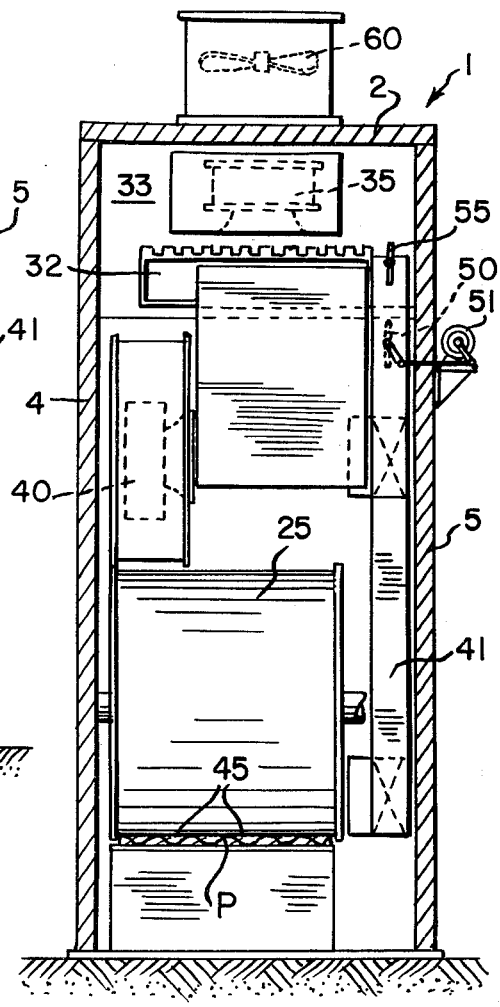

COMBINED OVEN AND FUME INCINERATOR AND METHOD OF OPERATING SAME

TECHNICAL FIELD

This invention relates to a combined oven and fume incinerator utilized in treating a product, for example a web of textile fabric and to a method of operating the same.

BACKGROUND OF THE INVENTION

Many textile treatment techniques incorporate subjecting textile fabric to hot air in order to air dry the fabric, to set the fabric, and, in many instances to cure chemicals with which the fabric may have been treated. Such techniques often result in contaminated air being released to the atmosphere from the process equipment raising environmental problems, which, because in part of governmental regulations, have become of increasingly greater concern.

It is known that by raising the temperature of air to be discharged by process equipment to a high temperature, for example, 800° F., that most, if not all pollutants in the air will be burned or incinerated destroying their toxicity. This however requires reheating of the discharged air to obtain the necessary high temperature resulting in use of additional energy which in many instances more than doubles the energy requirements needed to treat the product alone.

Attempts have been made to recapture part of the heat utilized in incinerating pollutants in contaminated air so that it could be used in the treatment of the product. Such attempts have used heat exchangers which has not all together been successful because of the heat losses involved in transporting exhaust contaminated air from the process equipment to a fume incinerator and then back again to the process equipment or to a heat exchanger.

It is therefore an object of my invention to provide for a combined oven and fume incinerator and a method of operating the same for treating a product which will utilize a minimum of energy necessary to maintain the desired air treatment temperature and at the same time provide the higher temperatures necessary to assure complete incineration of all the pollutants.

DESCRIPTION OF THE INVENTION

Broadly a combined oven and fume incinerator constructed according to my invention comprises an enclosed housing having at least one product process zone therein through which a product is moved by a product moving means so that the product passes into the housing through a product entry wall and passes from the housing through a product exit wall. A combustion chamber is included within the housing and forms an incinerator as well as providing a source of heat for the oven. A heat recovery duct extends in the housing from the combustion chamber to a process zone. A cool air inlet passage extends in the housing from the process zone to the combustion chamber and is in direct thermal contact with the heat recovery duct. Blower means are provided for circulating air from the process zone into the cool inlet air passage, then to the combustion chamber, then to the hot air recovery duct and back to the process zone. In this manner the heat from the hot air in the hot air recovery duct is transferred directly to the cooler air entering into the combustion chamber without going through a heat exchanger thus reducing energy requirements.

The apparatus also includes an exhaust fan located in the cool air inlet passage for withdrawing a portion of the air in the passage to a point exterior of the housing. The remainder of the air in the inlet passage is recycled back to the combustion chamber by the blower means. Make up air to replace the exhausted air is drawn into the housing through slots in the product entry and exit walls through which the product extends.

Preferably each process zone has a perforated drum therein over which the product is adapted to pass. A blower means is associated with each drum with its inlet communicating with a distribution passage extending from the hot air heat recovery duct and its outlet communicating with the drum exterior. In this manner hot air from the heat recovery duct is passed through the product carried on the drum surface to treat the same.

The device may have a plurality of process zones. In such event the distribution passages may be provided with damper means to regulate flow of hot air into the various processing zones while the heat recovery duct may be provided with controllable vents for returning excess hot air to the air inlet passage.

Preferably the device according to the invention also includes a combustion blower for blowing air into the combustion chamber from an air inlet passage which is not exhausted by the exhaust fan. This further recycling of air into the combustion chamber assures complete incineration of any pollutants that may by chance remain unburned during the previous passage through the combustion chamber.

The exhaust fan is preferably located near the product entry end of the housing since, in many cases, the product will be cooler at this end such that less pollutants will be emitted from the treated product and any pollutants that are emitted are mixed with water vapor reducing their concentrations and thus their toxicity. This is particularly true where the first process zone is used as a drying zone, a second zone is used both as a drying and curing zone and further zones are used for curing. It is these latter zones from which small particulate pollutants are released from the product being treated and which must not be released to atmosphere. Location of the oven exhaust fan where the process air is the cleanest reduces the quantity of air that the fume incinerator has to handle thus reducing overall energy requirements.

In some processes of treating a product, the pollutants are released from the product as it enters the oven. In those instances a combined oven and fume incinerator according to the invention is constructed such that the combustion chamber is located near the product entry end of the enclosed housing and the exhaust fan is located near the product exit end of the enclosed housing where less pollutants would be emitted to atmosphere. The structure of the combined oven and fume incinerator would remain substantially the same for both processes except for the reversal of the positioning of the combustion chamber and exhaust fan.

The invention also relates to a method of operating a combined oven and fume incinerator to treat a product. The oven and incinerator with which the method is used has an enclosed housing, a combustion chamber forming a fume incinerator and a source of heat for the oven, a plurality of process zones in the housing, a cool air inlet passage extending from the process zones to the combustion chamber, a hot air duct extending from the combustion chamber to the process zones, and blower means for circulating air through the combustion chamber into the hot air duct, then through the process zone, then to the cool air inlet passage and finally back to the combustion chamber. The method of the invention involves the step of exhausting a part of the air from the cool air inlet passage to atmosphere and the step of simultaneously recycling the remaining air back through the combustion chamber. The method may also include the additional step of exhausting air from the cool air inlet passage which is least contaminated with pollutants.

BRIEF DESCRIPTION OF THE DRAWINGS

FIG. 5 is an end sectional view taken along lines 5—5 of FIG. 1; and

FIG. 6 is an end sectional view taken along lines 6—6 of FIG. 3.

DETAILED DESCRIPTION OF THE PREFERRED EMBODIMENT

Figure 1:
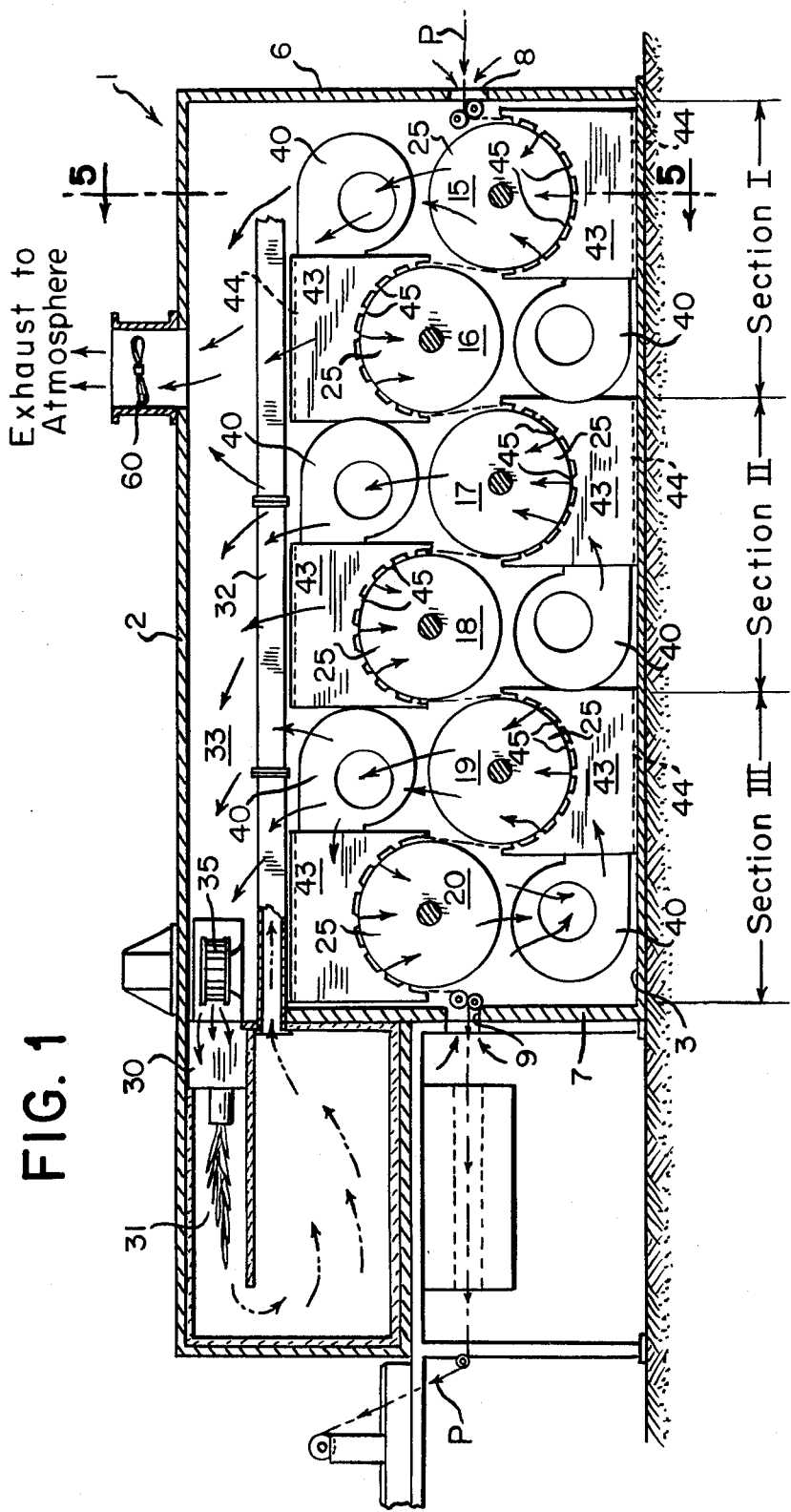
FIG. 1 is a partial side sectional view of a combined oven and fume incinerator constructed according to the invention.
Figure 2:
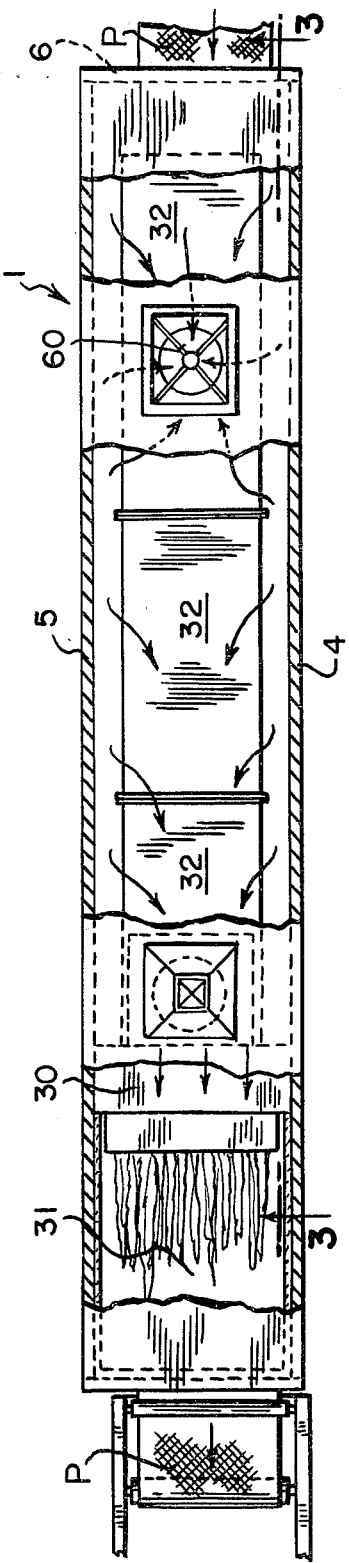
FIG. 2 is a partial sectional plan view of the oven and fume incinerator of FIG. 1.
Figure 4:
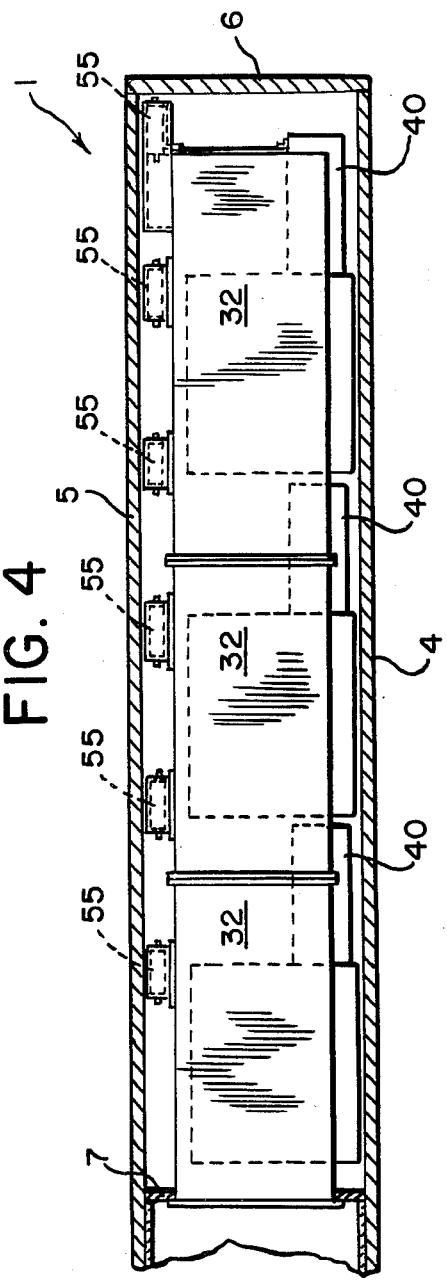
FIG. 4 is a sectional view of FIG. 3 taken along lines 4—4.

Referring to the figures, there is illustrated a combined oven and fume incinerator constructed according to the invention having an enclosed housing 1 comprising top wall 2, bottom wall 3, front wall 4, rear wall 5, product entry end wall 6 and product exit end wall 7 all of which preferably are insulated.

The product P to be treated enters into the housing 1 through a slot 8 in the product entry end wall 6 and exits from the housing through the slot 9 in the product exit end wall 7.

The housing is divided into a plurality of process zones 15-20 in turn arranged in Sections I, II and III as shown in FIG. 1 in which the product is treated by hot air to dry the product and to cure chemicals, for example resins, with which the product may be treated prior to entry into the housing 1.

Each process zone preferably includes a perforated rotatable drum 25 over which the product passes and which is rotated by drive means, not shown, such that the drum forms a means for moving the product through the housing.

A burner 30 is included in the housing at the top thereof and includes a combustion chamber 31 in which pollutants may be incinerated and which at the same time provides heat for the oven formed by the housing 1. A heat recovery duct 32 extends from the combustion chamber near one end wall 7 in the upper part of the housing towards the other end wall 6 to deliver heated air to the various process zones 15-20 as described in more detail hereafter.

The space between the heat recovery duct 32 and the upper wall 2 forms a cool air inlet passage 33 extending the length of the housing and leading to the inlet of a combustion blower 35 which feeds air into the burner 30 and combustion chamber 31 in order to support combustion. As shown the hot air duct 32 is in direct contact with the air inlet passage 33 so that there is direct heat transfer between the two without the intermediary of any separate heat exchanger.

Figure 3:
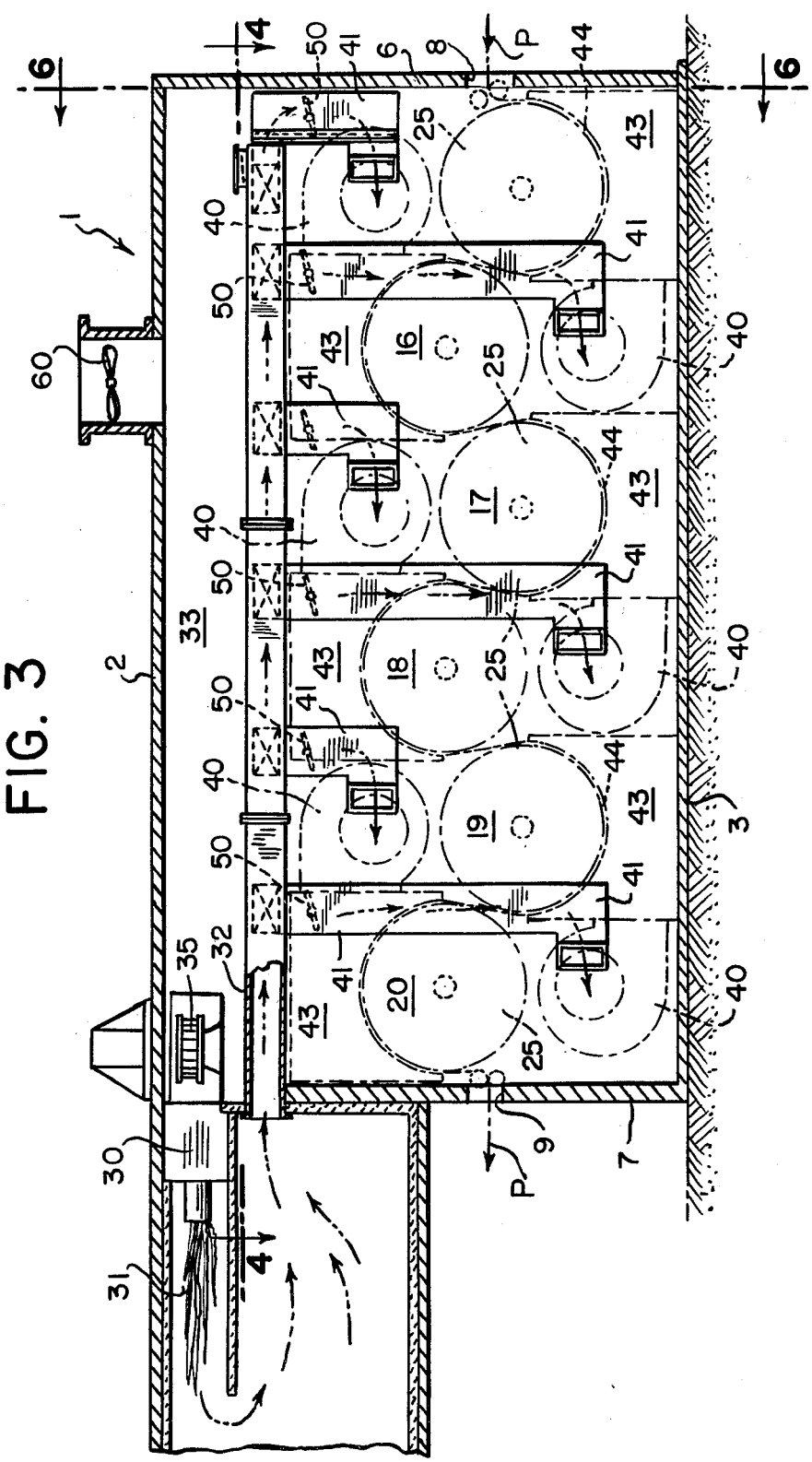
FIG. 3 is a partial side sectional view of FIG. 2 taken along lines 3—3.

Each process zone is provided with a blower 40 the inlet of which, as shown in FIG. 3, is in communication with a distribution passage 41 extending downwardly from the heat recovery duct 32. The outlet of each blower 40 leads to a pressure chamber 43 formed by generally semi-cylindrical end plates 44 concentric with and slightly spaced from an associated drum in a manner as more fully explained in U.S. Pat. No. 3,581,411. Each plate 44 is provided with a multiplicity of nozzle slots 45, as shown in FIG. 1, from which the hot air from the outlet of the blower 40 is blown onto the product P, through the perforated drum and then out the opposite side of the drum where the air then flows upwardly into the cool air inlet passage 33 in the top of the housing in the direction as shown by the arrows in FIG. 1.

Each distribution passage 41 has a damper means 50 therein by which flow of heated air into any process zone may be regulated. Regulation of each damper may be controlled by a servomotor 51 as shown in FIG. 6, which in turn may be responsive to a heat sensor contained in an individual process zone.

Controllable heat vents 55 are provided in a wall of the hot air recovery duct 32 which lead directly to the cold air inlet passage 33 in order that any hot air that may not be needed to treat the product may be recycled directly back to the combustion chamber.

An exhaust fan 60 is positioned near the product entry end wall 6 as shown in FIG. 1 and is used to exhaust a portion of treatment air from the housing directly to atmosphere with the remainder of the air in the inlet passage 33 being recycled back to the combustion chamber. Make up air necessary to replace the exhausted air enters into the housing through product entry slot 8 and product exit slot 9. In addition controllable shutters, not shown, may be provided in the walls of the housing to give a further measure of control of air circulated within the housing.

An advantage of placing the exhaust fan adjacent the product entry end wall 6 is that the fumes coming from the initial process zones 15 and 16 contained in Section I are less contaminated with pollutants than are the fumes in the process zones contained in Sections II and III. This is because the product entering the housing in the initial process zones in Section I is relatively cool containing uncured chemicals which only release pollutants upon becoming heated and, because the initial process zones act as drying zones driving moisture from the product which tends to reduce the concentration of any pollutants that may also be driven from the product during this stage. Location of the exhaust fan to take advantage of its exhausting less polluted fumes from the housing reduces the overall amount of air that must be moved through the fume incinerator thus further reducing overall energy requirements. Further such location and the fact that only a portion of the fume or air passing through the air inlet passage 33 is exhausted, results in a major portion of the fumes being recycled back through the combustion chamber. This recycling further assures that any pollutants in the fumes that may not have been burned on a previous passage through the combustion chamber will eventually be completely incinerated on a later passage through the incinerator.

The operation of the combined oven and fume incinerator is substantially as follows. The product P enters the housing into the process zones 15 and 16 contained in Section I where the product is subjected to a drying action driving off moisture and possibly small amounts of pollutants which will be in a diluted form due to the presence of moisture. The product next moves to process zones 17 and 18 in Section II where it is subjected to both a drying and curing action and finally to process zones 19 and 20 in Section III where it is subjected to a curing action only. As curing increases, fumes containing a greater concentration of pollutants are emitted. The exhaust fan exhausts a portion of the relatively uncontaminated fumes and moisture while the remainder of the fumes and most of the fumes containing greater amounts of pollutants are recycled back to the combustion chamber while at the same time being heated by the air in the heat recovery duct.

The quantity of high temperature delivered to the blowers 40 is controlled by dampers 50 to control the process air temperature in the various zones as may be required for proper product treatment. To prevent any excess heat build up in heat recovery duct 32 and to assure an adequate supply of air and oxygen to the combustion chamber, vents 55 may be controlled to recycle unused heated air back to the combustion chamber.

I have found that in a typical installation of the type as illustrated in the drawings, about 10% of the total amount of the air circulated in the housing by the blower 40 moves to the air inlet passage 33 and that about 3% of this air is exhausted by the exhaust fan 60 with the remainder being recycled back to the combustion chamber. Further I have found that the air in the passage 33 is approximately 250° F. and that this air when recycled back to the combustion chamber must be reheated to approximately 800° F. to provide for incineration of pollutants and to provide the necessary process heat in the heat recovery duct 32.

In those instances where the product to be treated involves one where pollutants are emitted at the beginning of treatment, it would be desirable to change the location of the exhaust fan such that it would be adjacent those process zones near a product exit wall rather than as shown in the drawing. In such event the position of the combustion chamber forming the incinerator would be moved closer to those process zones having the greater amount of fume pollutants, namely near the product entry wall of the housing.

While the structure shown in the drawings includes the incinerator positioned in the housing to gain the advantage of direct heat transfer between the inlet passage and heat recovery duct, the invention also includes the placement of the exhaust fan as described above near zones of lesser fume pollution and which is not dependent on location of the incinerator.

Conversely the advantages inherent in having the incinerator positioned in the housing to obtain efficient heat transfer is not dependent on the location of the exhaust fan.

I claim:

1. A combined oven and fume incinerator for treating a product comprising an enclosed housing having a top wall and front and rear walls, means for moving said product through said housing, a plurality of process zones in said housing for treating said product, a combustion chamber forming a fume incinerator and a source of heat for said oven, fresh air inlet means extending into said housing, a hot air outlet duct extending from said combustion chamber to said process zones, a cool air inlet passage in said housing formed in part by said top wall, said front and rear walls and said hot air outlet duct and extending to said combustion chamber, blower means for circulating air within said housing through said process zones into said air inlet passage, a combustion chamber, hot air outlet and back to said process zones, and an exhaust fan for exhausting a part of the air from said cool air inlet at a position where said air is least contaminated with fume to the exterior of the housing with the air not exhausted being recycled through said combustion chamber by said blower means.

2. A combined oven and fume incinerator for treating a product comprising an enclosed housing having a product exiting end wall at one end of said housing through which a product enters the housing, a product exit end wall at an opposite end of the housing through which a product exits the housing, a top wall, front and rear walls, means for moving a product through the housing, at least one product process zone in said housing for treatment of a product, a combustion chamber in said housing adjacent one end wall forming a fume incinerator and to provide a source of heat for said oven, a heat recovery duct within the housing extending from said combustion chamber adjacent said one end wall towards the other end wall to each process zone, a cool air inlet passage within said housing formed in part by said top wall, said front and rear walls, and said heat recovery duct in direct thermal contact with said heat recovery duct whereby cool air in said inlet passage is preheated by hot air in said heat recovery duct prior to entry to said combustion chamber, blower means for circulating air within said housing through said cool air inlet passage, combustion chamber, heat recovery duct and each said process zone, and an exhaust fan positioned near said other end wall for exhausting a portion of the air from the cool air inlet passage with substantially the remainder of the air in said passage being recycled to said combustion chamber.

3. A combined oven and fume incinerator according to claim 2 wherein make up air enters into said housing through a product entry slot in said product entry wall and through a product exit slot in said product exit wall.

4. A combined oven and fume incinerator according to claim 2 having in addition a perforated drum in each process zone over which the product is adapted to pass, a blower means associated with each drum, and a distribution passage associated with each drum extending from said heat recovery duct to the inlet of each said blower means with the outlet of each said blower means communicating with the exterior of a drum whereby air flows through a drum into a process zone.

5. A combined oven and fume incinerator according to claim 4 having a plurality of process zones.

6. A combined oven and fume incinerator according to claim 5 wherein said combustion chamber is adjacent said product exit wall and said exhaust fan is positioned near the product entry wall.

7. A combined oven and fume incinerator according to claim 6 having in addition damper means in each said distribution passage for regulating flow of heated air into each process zone.

8. A combined oven and fume incinerator according to claim 5 or 6 having in addition adjustable vent means in said heat recovery duct for controllably returning hot air from said duct to said inlet passage.

9. A combined oven and fume incinerator according to claim 2 having in addition a combustion blower means associated with said combustion chamber for blowing the recycled air from said inlet passage into said combustion chamber.

10. A method of operating a combined oven and fume incinerator to treat a product having an enclosed housing, a combustion chamber forming a fume incinerator and a source of heat for said oven, a plurality of process zones in said housing, a cool air inlet passage extending from said process zones to said combustion chamber, a hot air duct extending from said combustion chamber to said process zones, a blower means for circulating air in said housing through said combustion chamber into said hot air duct to said process zones and from said process zones to said air inlet passage and from said air inlet passage into said combustion chamber, and an exhaust fan for exhausting a portion of the air from said cool air inlet passage; comprising the steps of simultaneously exhausting a portion of the air circulating in said cool air inlet which is least contaminated with fume to a point exterior of the housing and recycling the remaining air in said cool air inlet passage through said combustion chamber.

* * * * *